Feb. 12, 1963

R. H. OLSON ETAL 3,077,096

APPARATUS FOR CONTROLLING FORMATION OF
BLOWN GLASS ARTICLES

Filed Aug. 7, 1958

INVENTOR.
RALPH H. OLSON
CLARENCE C. KINKER
BY
ATTORNEYS

INVENTOR.
RALPH H. OLSON
CLARENCE C. KINKER
BY
ATTORNEYS

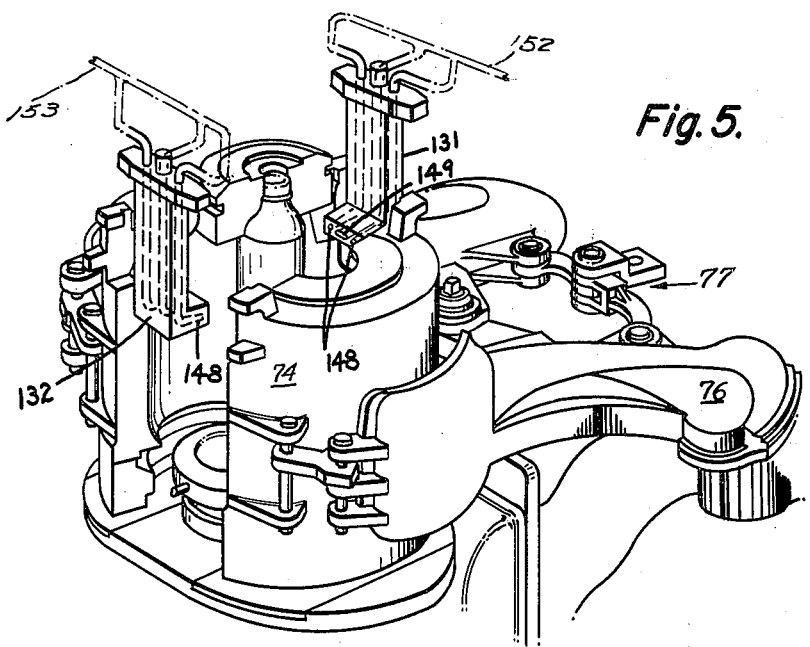
Fig. 5.
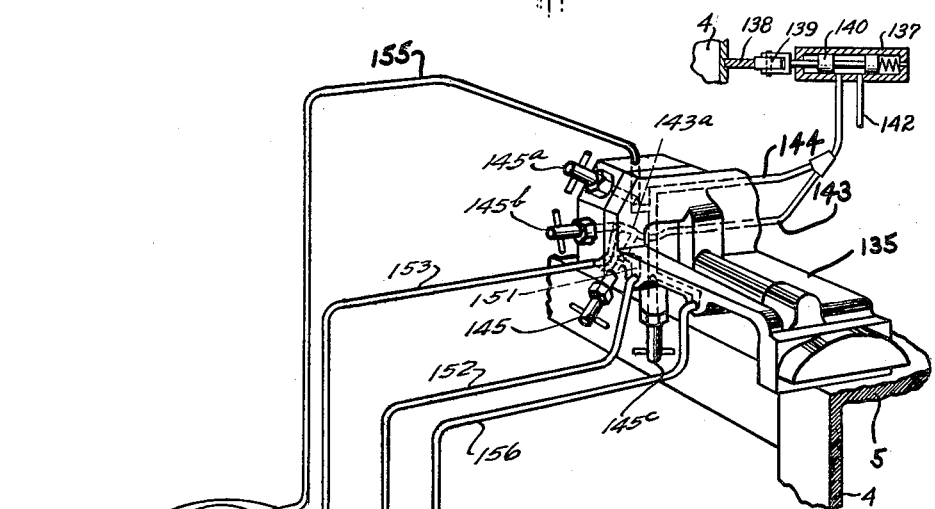
Fig. 6.
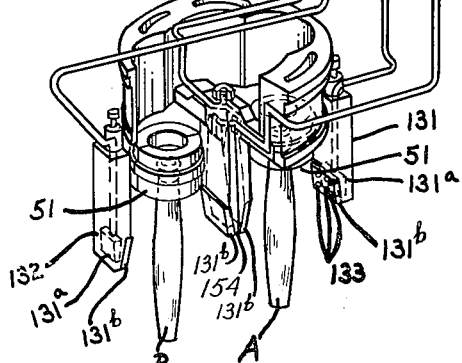

Feb. 12, 1963   R. H. OLSON ETAL   3,077,096
APPARATUS FOR CONTROLLING FORMATION OF
BLOWN GLASS ARTICLES
Filed Aug. 7, 1958   4 Sheets-Sheet 4

INVENTOR.
RALPH H. OLSON
CLARENCE C. KINKER
BY W. A. Schaich
   Leonard D. Aubin
ATTORNEYS United States Patent Office 3,077,096
Patented Feb. 12, 1963

3,077,096
APPARATUS FOR CONTROLLING FORMATION
OF BLOWN GLASS ARTICLES
Ralph H. Olson and Clarence C. Kinker, Toledo, Ohio, assignors to Owens-Illinois Glass Company, a corporation of Ohio
Filed Aug. 7, 1958, Ser. No. 753,789
6 Claims. (Cl. 65—323)

Our invention relates to the control of the distribution of glass throughout the walls of a blown glass article regardless of the method by which the article is produced, namely, whether that article may be produced by the well known Owens suction method, the press and blow method, or the blow and blow method such as practiced in the well known Lynch forming machines.

In the glass forming art as presently practiced, the wall thickness of the glass articles is found to be controlled mainly by the shape of the parison, the wall thickness of the parison forming mold, the time interval of contact as between the glass and the parison mold, and/or the amount of the cooling applied to the walls of the parison shaping mold. In any event the present practice is to apply these factors to control ultimate wall thickness of the finished blown article as the parison is being shaped within the confines of the parison mold.

It is contemplated that by the present invention apparatus be provided whereby the wall thickness of the ultimately blown glass article may be controlled subsequent to the parison molding step of the forming process and throughout both the circumference and length of the blown article. In addition, such control may also be confined to a specific area, either of a localized spot on the wall, an extended circumferential form, or a pattern extending along the length of the article being blown.

An important object of this invention is to produce a pattern of glass distribution in a parison which is not possible with the methods of present day practice, for example, to put the glass where it is needed to strengthen the bottle for its particular end use in the trade and to make the ware more functional.

A further object of this invention is the provision of apparatus for obtaining control of the strength supplied in the wall structures of such blown articles by an exact and specific control of wall thickness in specific areas.

A still further object is to provide apparatus operable during the forming process whereby the speed of production of the process may be increased.

A still further object is to provide a more accurate control of the weight of the blown articles produced.

Other objects will be apparent from the following description.

In the drawings:

FIG. 5 is a perspective view showing the relationship between the neck mold and its parison, the cooperative blowing mold and the parison cooling nozzles in a single mold operation;

FIG. 6 is a schematic view illustrating the control for applying coolant to the nozzles and the piping system for the coolant in a plural parison operation;

Figure 7:
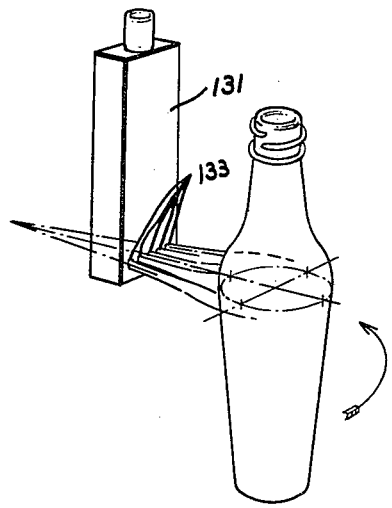
Figure 8:
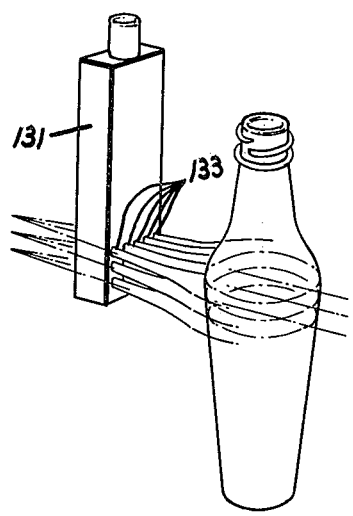
Figure 9:
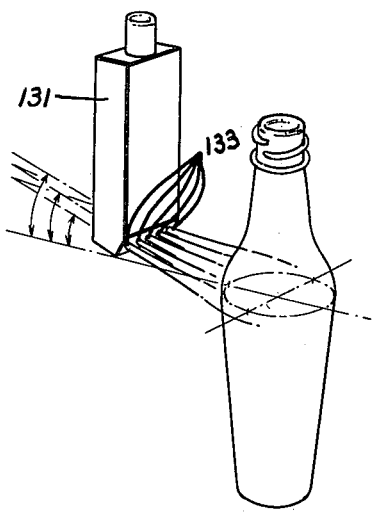

FIGS. 7, 8, and 9 are schematic illustrations of how the streams of cooling air can be impinged upon the surface areas of a parison for the control of application of such cooling. More specifically:

FIG. 7 illustrates the angular disposition of the orificial openings of the nozzle in a single horizontal plane;

FIG. 8 illustrates the angular disposition of the orificial openings of the nozzle in a series of juxtaposed horizontal planes; and FIG. 9 illustrates the disposition of the orificial openings of the nozzle in a single horizontal plane but with the path of the coolant inclined from the vertical horizontal plane.

For a description of the well known Owens suction machine reference may be had to the mentioned Patent No. 1,185,687. The description hereinafter pertains specifically to a preferred embodiment of the invention as applied to this Owens mechanism, and is, therefore, intended merely for the purpose of illustrating the application of the present invention to one of the present day glass forming processes, such as mentioned above. It is to be understood that this invention can be applied to any of the other well known forming machines, such as the IS machine, the Lynch machine or a Miller press and blow machine.

Referring to the drawings, it will be noted that the entire structure of an Owens suction machine has not been shown because of the fact that it is extremely well known and readily understood by those skilled in the glass container industry and related arts and disclosed in any one of several issued patents. It will be understood, therefore, that in such machines there is a central column around which the frame of the machine is adapted to revolve and this frame is provided with a series of like forming mechanisms commonly referred to as forming heads. The frame referred to has included an upper spider indicated broken away at 5 in FIG. 6. Any desired number of machine heads may be provided around the circumference of the machine frame.

In the specific embodiment of our invention, as herein shown, we have illustrated the mechanism for gathering and forming a hollow necked bottle, for example, an ordinary beverage bottle.

There is a frame on each machine head, generally referred to as the dipping frame, which raises and lowers on the rotating machine frame as it carries the gathering mold to and from the molten glass so that the mold may be filled and withdrawn when filled.

The mold in which the blank is formed comprises a neck mold and a body blank mold, each made in sections, and a cutoff knife for severing the string of glass depending from the gathered glass in the blank mold. Mechanism is also provided for opening and closing the mold sections and for raising and lowering the plunger which forms the initial blow opening in the blank for opening and closing the valves for producing a vacuum to effect the gathering and later for opening and closing an air valve for blowing the blank and for raising and lowering the dipping frame at any desired points in its travel.

Figures 1, 2:
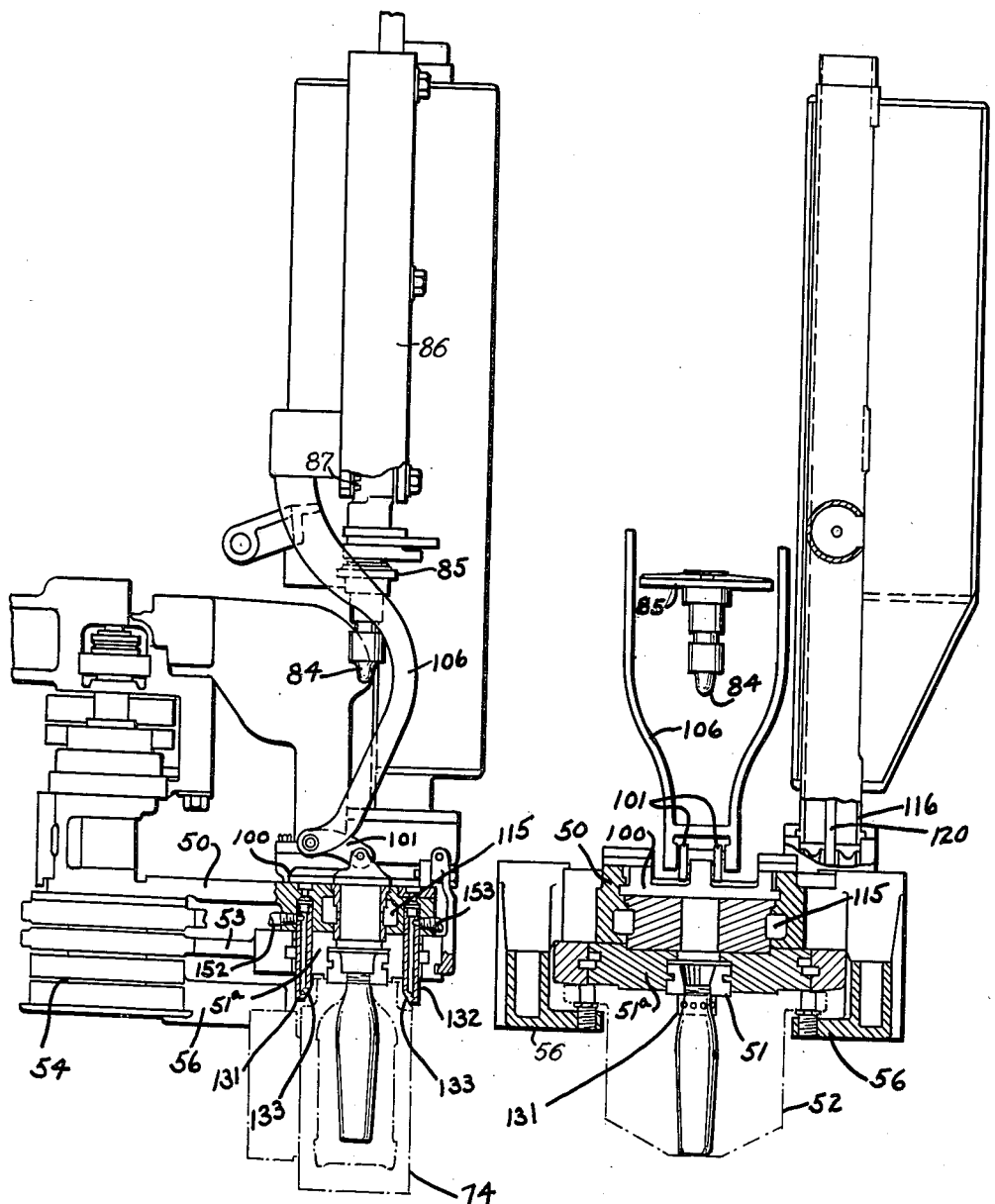
FIG. 1 is a part-sectional elevational view on a radial line through the head and neck mold of an Owens suction machine as disclosed in U.S. Patent No. 1,185,687, illustrating the position of parison cooling devices with respect to a parison in a single mold operation.
FIG. 2 is a part-sectional elevational view through the head and neck mold of an Owens suction machine taken at right angles to that of FIG. 1 and illustrating the relationship with respect to the parison and cooling nozzle.

The dipping frame, at its lower end, is provided with a lateral projection forming the dipping head 50, below which sectional neck molds 51 and partible body blank molds 52 are arranged (FIGS. 1 and 2). The neck mold sections are attached to the outer ends of arms 53 and are pivoted on a pin 54 journaled in the dipping frame and extending above and below the plane of the head 50. The two neck mold arms 53 are pivoted below the plane of the head and carry at their outer ends the neck mold sections 51. The body blank molds are carried upon the bifurcated arms 56, the lower furcations of which are pivoted at the lower end of the pin 54 below the plane of the head 50 and the upper furcations of which are pivoted at the upper end of the pin and above the plane of the head. These arms 56 carry suitable partible complementary body blank mold sections 52 which are arranged to close along a mold seam which is the mold parting line therefor.

The arms 53 have an extension 58 inward from the pin 54 and between the inner ends thereof is a spring tending normally to hold the neck mold sections tightly together.

The blank molds are opened and closed by means of a cam carried on the frame engaged by a roller. This roller is connected to actuate the blank mold arms.

The blank mold arms are connected by links which are in turn connected so that the inward and outward movement of the roller will, through these connections, open and close the blank molds at the proper time and will, at the extreme movement of the blank mold, also open the neck mold.

A pin or core 84 is provided which enters the neck mold and makes what is called the initial blow opening during the gathering of the blank and then is withdrawn when the article is blown. It is secured upon the lower end of a plunger rod 85, which is supported slidingly by housing 86.

Upon one face of rod 85 is a rack gear segment 87. A meshing gear segment (not shown) is provided on each head of the Owens machine and this gear segment is driven in opposite directions to raise and lower the plunger rod 85 and the pin or plunger 84 thereon will be moved into and out of the blank mold through the neck mold at the desired time. On the dipping head 50 is an air valve 100 for connecting the interior of the neck mold with an air supply for blowing. This valve 100 is connected by a link 101 to the lower end of a lever 106. The air for blowing the bottle is supplied when the valve 100 is shifted outwardly. When the valve is withdrawn this air supply is shut off.

A vacuum connection, shown in FIG. 1, is at chamber 115 in the dipping head. Chamber 115 leads to one side of the dipping head and thence connected to a vertical pipe 116 (FIG. 2) which at its upper end is connected to a suitable vacuum producing means.

This machine, as is usual in machines of this type, is provided with a sectional partible blow mold 74. The blow mold is supported in the hinged frame 76 and is closable along its parting line or mold seam. Conventional means is provided for opening and closing the mold sections through actuation of linkages 77. The construction and operation of the mold opening and closing means will be well understood by reference to the patent previously referred to herein.

The features of the novel apparatus of this invention, as applied to the above described Owens suction machine, will now be described.

Mounted in the dipping head 50 are mold centering pins 131 and 132 (FIGS. 1 and 3) which project downwardly from the head into such position that the neck mold holders 51$^a$ may contact the sides of these centering pins and equalize their alignment with respect to the radial center line of the head 50. These neck mold holders 51$^a$ are so constructed that they have a limited motion about the vertical axis of the head 50, thus permitting the halves of this neck mold holder to be brought into perfect alignment (see FIGS. 1 and 2). The mold centering pins are of sufficient length to extend to a point beneath the bottom surface of the neck mold holders 51$^a$ and lie along the parting line for the blank mold halves and the blow mold halves. The halves of the blank molds 52 close so as to contact and center around these pins to bring the blank molds into alignment with the neck molds. Thus, when the blank molds are closed at their parting line, they will completely envelop nozzles 133 on the lower extremities of centering pins 131 and 132 and prevent any emission of coolant therefrom even though the hereinafter mentioned air control valves therefor may be open at the time (see FIG. 2).

This same situation also exists with respect to the blow molds. For example, in FIGS. 1 and 3, it is indicated that the partible blow mold when closed along its parting line is in cooperative position with respect to the neck molds and the parison, and completely envelops the nozzles and will prevent any air from the nozzles to come in contact with parisons during this period even though the mentioned air valves controlling the emission of air at nozzles 133 may be open.

Under these conditions of mold envelopment of the nozzles 133 in centering pins 131 and 132, it will be apparent that no air may be impinged upon the surface areas of the parison until such time as the parison mold 52 begins to open. Then as the molds continue to open, the horizontal width of the band of air being emitted from the nozzle openings 133 will continue to expand through the horizontal plane until such time as the molds are sufficiently opened to permit the full width of the nozzles of pins 131 and 132 to become active, such as is illustrated in FIG. 7.

Figure 3:
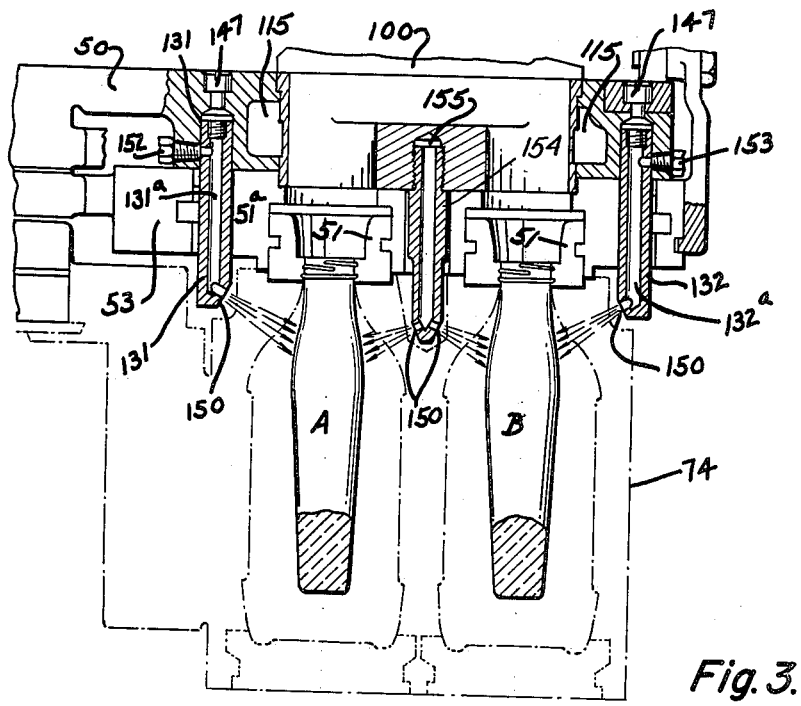
FIG. 3 is an enlarged radial part-sectional elevation taken through an Owens suction machine head illustrating a plural mold operation and the position of the cooling nozzles in such an operation.

As the blank mold reaches its wide-open position, the blow mold sections 74 are moving upwardly in a vertical plane into cooperative position with the parison and as they reach the horizontal plane, they are closed about the parison, as indicated in FIGS. 1 and 3. Thus, with the closing of these blow molds, a contrary operation occurs, that is, the horizontal width of the band of impinging air in the horizontal plane is gradually decreased by the interference of these closing molds until such time as the molds reach a completely closed position, thereby cutting off any further air impingement upon the parison. From this it should be quite apparent that these cooling air bands may be applied to the parison and controlled in their application merely by the opening and closing movement of the blank mold and blow mold halves.

As a further and more practical control, both as to volume of air and timing, a control block 135 (FIG. 6) is mounted on the upper spider member 5 of the machine frame, there being provided a control block for each individual head of the machine. A timing valve 137 (shown schematically on FIG. 6) is also mounted on the frame 5 and there is an individual valve for each head of the machine. A single cam 138 mounted on the stationary central column 4 of the machine provides the timing and duration of a supply of air through the control blocks 135 by actuating a cam roller 139 and a valve stem 140 in the valve 137. Air to the valve is connected through a supply line 142 and a supply of air to the control block 135 is obtained through a line 143 and 144 and controlled by the valve 140.

The supply or volume of air to the nozzles of centering pins 131 and 132 may be independently controlled, for example, by means of valves 145, 145$^a$, 145$^b$, 145$^c$ in the valve block 135. In the event that the operation is a single cavity operation, that is, the production of a single parison on each forming head, then only two nozzles at 131 and 132 are required and the design of the emission portion of these valves may be controlled to suit the particular parison being produced. For example, in FIG. 7 there is shown a series of emission openings 133 which are arranged in the same horizontal plane, but angularly disposed in this plane, to thereby provide a band of air which will impinge upon a defined vertical area of the parison and through at least 180° of the circumferential area thereof. The exact point of impingement of this band upon the parison is controlled by the length of these centering pins 131 and 132 or they may be adjustable in the head 50 by and through the adjusting screws 147.

A further manner in the control of the point and/or defined area of impingement of these cooling air bands upon the surface areas of the parison may also be obtained by the forming of the emission openings 133 at an angle inclined from the horizontal as well as the angular disposition in the horizontal plane, such as is indicated in FIG. 9.

In order to control the vertical height or length of the band at the point of impingement, a series of rows of openings 133 may be provided in the nozzles 131 and 132 such as is illustrated in FIG. 8. A nozzle made in accordance with the disclosure in FIG. 8 will provide a band of air or coolant which will cover at least 180° of the circumferential surface area of the parison plus any desired height or length of band along the length of the parison. For example, by increasing the length of the nozzle 131 in FIG. 9 and the number of horizontal rows of the openings 133, any desired length of the parison up to and including the total length thereof may be enclosed by a coolant supplied by these nozzles. In other words, with the provision of a plurality of nozzles, such as shown in FIGS. 1, 3, 5 and 6, any desired amount of the total surface area of a parison, or a plurality thereof, may be encompassed by a cooling medium. In addition, by manipulation of the valves 145, 145ª, 145ᵇ, 145ᶜ and the cam 138, respectively, any desired volume and timing of air application may also be obtained within the period between the opening of the blank mold and the closing of the finish or blow mold.

By providing openings of differing areas and/or contours, such as the openings 148 and 149 (see FIG. 5) a different type of cooling pattern may be applied to the surface areas of the parison. As a further example, if a single opening 150 is provided in the lower end of the nozzle, such as is indicated in FIG. 3, then a single spot of cooling may be applied to a side or sides of a parison with said spot extending circumferentially through any desired circumferential and vertical length.

As an example of the control which may be applied, reference is made to FIG. 6, wherein it is shown that the coolant is brought to the control block 135 by the main or valve controlled lines 143 and 144. Line 143, for example, leads into the control block to the needle valve 145, then through a line 151 to the line 152 and into the chamber 131ª of the centering pin 131. A nozzle plate 131ᵇ is attached to the inner side of the nozzle 131 and is provided with a series of prearranged outlet openings 133 capable of providing a band of coolant on the side of the parison and similar to that shown in FIG. 8. By adjustment of the needle valve 145ª the amount of air flowing to the nozzle or centering pin 131 may be controlled so that only a given amount of air will be supplied to this point during the time that the cam 138 holds the valve 140 in the open position. The nozzle or centering pin 132 is likewise controlled through the admission of air from line 143 through line 143a to the needle valve 145ᵇ which permits the supply of air to pass through line 153 to the nozzle 132. Nozzle 132 is also provided with a plate 131ᵇ in which a series of prearranged openings 133 are also provided.

Figure 4:
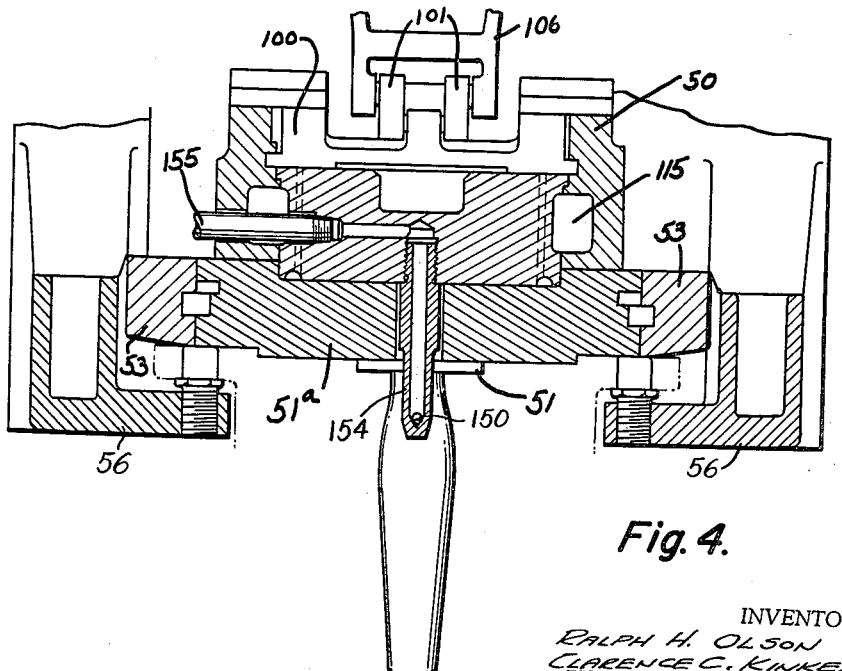
FIG. 4 is an enlarged sectional elevation taken at right angles to that of FIG. 3 illustrating the positioning of the central cooling nozzle with respect to the plural parisons.

In the event that a plurality of parisons are being made simultaneously, such as during operation of the machine generally known as "double gobbing," i.e., forming a pair of parisons in side by side relationship as shown on FIGS. 3, 4, and 6, then a center nozzle 154 is provided which is baffled into side-by-side chambers connected to oppositely facing openings 133 and in effect is a composite of the nozzles 131 and 132. That is, there will be supplied two separate chambers 131ª to which the air will be supplied and two nozzle plates 131ᵇ will also be supplied. The control of the cooling fluid to these will be obtained in this manner. For example, air will flow from line 144 past the needle valve 145ª into the line 155 and thence to the one inner half of the nozzle 154. Similarly, air will flow from line 144 past the middle valve 145ᶜ into line 156, and thence to the other inner half of the nozzle 154. Thus, by controlling the needle valves 145 and 145ᶜ a volume of air through lines 152 and 156, respectively, to the opposing nozzle plates 131ᵇ on 131 and right half of 154 (FIG. 6) may be regulated and controlled in its application to the parison "A." The application of the coolant to the parison "B" is also regulable and controllable by and through the adjustment of needle valves 145ª and 145ᵇ.

From the above it should be apparent that by the prearrangement and design of the orificial openings in the plates 131ᵇ plus the regulation of the valves 145, 145ª, 145ᵇ and 145ᶜ and the adjustment of the cam 138 any desired form of a pattern, volume and time of coolant application can be obtained and maintained.

The parts of the Owens suction machine being thus arranged and constructed to include the novel apparatus of this invention, their operation is as follows. The machine is arranged so that in the course of rotation the blank molds will pass over a pool of molten glass. The neck molds and blank molds are then closed and in the position shown in FIG. 2, with the blanks aligned by centering pins 131 and 132 and their nozzles 133 closed, as was previously described. The plunger rod 85 is also lowered. As the blank mold comes over the molten glass pool, the dipping head is lowered until the bottom of the blank mold touches the top of the molten glass. At this time the vacuum is applied by operating valve stem 120. Atmospheric pressure on the molten glass lifts glass into the blank and neck molds until they are filled and the blank is initially formed. The dipping head is then raised and at this time the blank mold is filled. The cut-off knife is next moved across the lower end of the blank mold. The blank mold sections are then opened. Cooling air is then permitted to be emitted from the nozzles 133 and impinge on the parison, according to a desired pattern, as explained above.

At the same time that the cooling air is impinged upon the outer surface areas of the parison, air may also be admitted to the inside of the parison. In this manner the volume of glass in the shoulder portions of the parison may be shaped and controlled and the temperature conditions thereof may also be controlled. Thus, it is possible to simultaneously apply cooling to both the inner and outer surface areas of a parison during its formative period. At this time the open blow mold 74 is lifted relative to the parison and closed to enclose the parison. The blow mold 74 seats itself about the centering pins 131 and 132, thus again closing the nozzles 133. Air is next admitted to the interior of the blank to blow the bottle to finished form. When the bottle is blown, and as it approaches the end of its circular travel, the blank molds are opened still farther and the neck mold is opened sufficiently to allow the bottle to be withdrawn therefrom. At this time the bottle is still enclosed in the blow mold. The blow mold is next lowered out of the way of the blank molds and neck molds. The blow mold sections are then opened to drop out the bottle and the blank and neck molds are closed for repeating the operation described.

From the preceding description, it should be apparent that in the operation of an Owens suction machine the blow molds in their movement toward the parison while suspended by the neck mold will provide relative movement as between the parison and the blow mold in a single plane and thereby position the parison within the blow mold so that it may be blown to final form after the mold is closed about it. In addition, the normal operation of the Owens machine also provides, with the opening of the parison mold away from the parison, that the parison per se is being moved in a further single plane, namely, the horizontal plane, to a position where it can be and is encompassed by the blow mold for blowing to final form. Thus, there is provision in the Owens machine for the movements of the mechanism by which a transfer of the parison from a forming station to a blowing station is effected, said transfer being accomplished during movement of the parison in one of two defined planes, namely, a horizontal plane. Moreover, this transfer of the parison is accomplished by relative movement between it and the blow mold to which it is transferred in a vertical plane. In other words, the accomplishment of the transfer in the Owens machine provides movements equivalent to those found in most any of the well known glass forming machines.

Obviously, the novel apparatus of the invention, which is described herein as adapted only to the Owens suction machine, may be modified to be adapted to other commercial types of glassware forming machines, as suggested previously in the present disclosure.

Hence, it is contemplated that many modifications may be resorted to within the spirit and scope of the appended claims.

We claim:

1. In a glass forming machine the combination of apparatus for controlling distribution of glass in the walls of a blown glass article, said machine including a frame, partible neck mold, parison mold, and blow mold, each of said molds defining a cavity and being movably supported by said frame, said apparatus comprising means carried on said frame for supporting the neck mold, means for selectively cooling a parison, said cooling means comprising elongated nozzle members connected to said neck mold support means and extending in spaced, opposed, parallel relationship with respect to a parison carried in said neck mold, said nozzle members having coolant passages therein and interconnected openings directed toward the parison for circumferential impingement cooling of the parison held by said neck mold, means connected to the neck mold support for moving the latter and the neck mold while transferring the parison from the parison mold to the blow mold, said parison mold and blow mold each having means comprising cut-out portions of the molds by which the openings of the nozzle members are covered when either of the molds are in their molding position, means for feeding coolant under pressure to said nozzle passages, means connected to said frame for moving the parison mold into and out of glass parison molding position and in said position closing the openings of the nozzles, and means connected to the frame for moving the blow mold into and out of blow molding position and in said position closing the openings of the nozzles, whereby said nozzles deliver coolant to selected portions of the parison during the period of parison exposure prior to its enclosure in the blow mold.

2. The apparatus of claim 1, wherein said neck, parison, and blow molds are each plural cavity molds, and said nozzle members are arranged in oppositely disposed facing relationship on opposite sides of each neck mold cavity and the parison connected therewith.

3. The apparatus defined in claim 1, wherein the parison mold is a split mold comprising complementary half sections movably mounted on said frame for opening and closing along a parting line, said cut-out portions of the parison mold being located at said parting line, and said nozzle members extending along said parting line, the nozzle members also serving as a centering guide at the parting line for orienting the parison mold upon closing.

4. In a glass forming machine the combination of apparatus for controlling distribution of glass in the walls of a blown glass article, said machine including a frame, and a partible neck mold, a partible parison mold, and a partible blow mold, each of said molds being comprised of complementary half-sections movably mounted on said frame for opening and closing along a parting line in a common plane and defining a cavity, said apparatus comprising means carried on said frame for supporting the neck mold, means for selectively cooling a parison, said cooling means comprising a pair of elongated nozzle members connected to said neck mold support means and extending in said common plane in opposed, facing relationship with respect to a parison carried in said neck mold, said nozzle members having coolant passages therein and interconnected openings directed toward the parison for circumferential impingement cooling of the parison held by said neck mold, a source of coolant under pressure, means connected to said source for feeding coolant to said nozzle passages, means connected to said frame for opening and closing the parison mold sections along said parting line, said parison mold sections having matching surfaces at the parting line that will when the mold is closed define cut-out portions that receive and enclose the nozzles, and means connected to the frame for opening and closing the blow mold sections about the parison held in the neck mold, said blow mold sections having matching surfaces at the parting line that will when closed define cut-out portions that receive and enclose the nozzles, whereby said nozzles are permitted to deliver coolant to selected portions of the parison during the interval between opening of the parison mold sections and closure of the blow mold sections.

5. The apparatus of claim 4, wherein said means for feeding coolant includes valve mechanisms connected individually to each of said nozzles to control the volume of coolant applied by each of said nozzles.

6. In a glass forming machine the combination of apparatus for controlling distribution of glass in the walls of a blown glass article, said machine including a frame and a partible neck mold, a partible parison mold, and a partible blow mold. each of said molds being comprised of complementary half-sections having mating faces that meet along a parting line in a common plane and define a cavity and are movably supported by said frame, said apparatus comprising means carried on said frame for supporting the neck molds, means for selectively cooling a parison, said cooling means comprising a pair of elongated nozzle members conected to said neck mold support means and oppositely disposed at said parting line to extend in spaced relationship with respect to a parison carried in said neck mold, said nozzle members having coolant passages therein and interconnected openings directed toward the parison for circumferential impingement cooling of the parison held by said neck mold, said parison mold and said blow mold each having cut-out portions on the mating faces of their sections for respectively enveloping the nozzle members when either of said molds are closed along said parting line, a source of coolant under pressure, means connected to said sources for feeding coolant to said nozzle passages, means connected to said frame for opening and closing the parison mold sections along said parting line and upon opening said mold sections permitting the nozzles to apply coolant to the formed parison held by the neck mold, means connected to the frame for opening and closing the blow mold sections along said parting line and upon closing said mold sections enveloping the nozzles preventing coolant application to the parison, and cam-controlled valve means in said coolant feeding means for controlling the duration of the application of coolant by the nozzles to the parison in the interval between the respective opening and closing movements of said parison mold and blow mold sections.

References Cited in the file of this patent

UNITED STATES PATENTS

| | | |
|---|---|---|
| 443,403 | Neville | Dec. 23, 1890 |
| 1,865,730 | Soubier | July 5, 1932 |
| 2,034,844 | Soubier | Mar. 24, 1936 |
| 2,167,919 | Wadsworth | Aug. 1, 1939 |
| 2,269,553 | Roessler | Jan. 13, 1942 |
| 2,275,231 | Pearson | Mar. 3, 1942 |
| 2,314,290 | Smith et al. | Mar. 16, 1943 |
| 2,336,822 | Wadman | Dec. 14, 1943 |
| 2,702,444 | Rowe | Feb. 22, 1955 |
| 2,950,816 | Arenz | Aug. 30, 1960 |